(12) United States Patent
Hoshihara et al.

(10) Patent No.: US 6,234,574 B1
(45) Date of Patent: May 22, 2001

(54) AUTOMOBILE SEAT SUPPORTING APPARATUS

(75) Inventors: Naoaki Hoshihara, Aichi-ken; Yukifumi Yamada, Toyota, both of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/399,183

(22) Filed: Sep. 20, 1999

(30) Foreign Application Priority Data

Sep. 21, 1998 (JP) .................................................. 10-267051

(51) Int. Cl.⁷ ...................................................... B60N 2/00
(52) U.S. Cl. ............................................. 297/336; 297/331
(58) Field of Search ...................................... 297/331, 326, 297/336, 335, 328; 296/65.01, 65.05

(56) References Cited

U.S. PATENT DOCUMENTS

| 4,865,377 | * | 9/1989 | Musser et al. . |
| 5,282,662 | * | 2/1994 | Bolsworth et al. . |
| 5,498,051 | * | 3/1996 | Sponsler et al. . |

FOREIGN PATENT DOCUMENTS

| 5-58453 | 8/1993 | (JP) . |
| 9-86230 | 3/1997 | (JP) . |

\* cited by examiner

*Primary Examiner*—Milton Nelson, Jr.
(74) *Attorney, Agent, or Firm*—Burns, Doane, Swecker & Mathis, LLP (57) ABSTRACT

To be able to firmly fix a seat to a floor when the seat is elevated relative to the floor, a pair of hooks are installed at a hook portion of a base member and the two hooks are made engageable to a pair of strikers on the floor.

8 Claims, 7 Drawing Sheets

AUTOMOBILE SEAT SUPPORTING APPARATUS

BACKGROUND OF THE INVENTION

The present invention relates to a seat supporting apparatus suitable for an automobile seat capable of being freely folded up or erected (or molded down) as well as being attachable and detachable with respect to an automobile floor panel.

According to a vehicle such as a van type one, when the number of passengers is large, an auxiliary seat is fixed onto a floor panel of the vehicle and when the number of loaded articles is large, the auxiliary seat is removed to thereby keep the large loading space. As proposed by, for example, Japanese Patent Laid-Open Publication No. 86230/1997 or Japanese Utility Model Laid-Open Publication No. 58453/1993, an attachable and detachable seat of this kind has a basic structure in which a seat supporting member is made attachable to and detachable from a pair of strikers fixed to a floor of a vehicle. Whereas a rear striker is simply attached to and detached from a front hook portion of the seat supporting member, a rear striker is attached to and detached from a ratchet mounted to the seat supporting member and movement of the ratchet is controlled by a pawl.

According to the seat supporting apparatus of the above-described conventional examples, whereas when a seat is forwardly tilled or collapsed, the front striker is brought into contact with a U-like groove of the hook portion fixed to a base member and the seat is folded forwardly centering on the point of contact, in erecting the seat, the rear seat is tied to the front seat by using a string or the like to thereby maintain the folded state of the seat. Or, another means for keeping the seat from returning to the original position, newly changing the seat position, moving the gravitational center of the seat forward.

Such a means is not favorable for elevating (or collapsing) the seat in a safe state because it cannot firmly prevent the seat from rocking or returning to the original position unexpectedly.

SUMMARY OF THE INVENTION

Hence, it is the problem of the invention to resolve the disadvantage of the conventional technology, mentioned above.

According to the invention, in order to resolve the above-described problem, basically, there is provided means for parallely installing U-like shape and C-like shape hook portions for receiving a pair of strikers at front of the base member and moving a pivot center of the seat from a point of contact between the U-like groove and the first striker to a point of contact between the C-like groove and the second striker in elevating the seat.

Specifically, according to an aspect of the invention, there is provided a vehicular seat supporting apparatus having a front hook portion and a rear ratchet capable of freely engaging with a front striker and a rear striker fixed to the floor of a vehicle and suitable for supporting a seat, the seat supporting apparatus comprising a base member supporting the seat and attachable and detachable to and from the rear striker fixed to the floor of the vehicle, the ratchet able to engage with and disengage from the rear striker, and pivoting at the base member's 2 hook portions in the front having a U-like shape and a C-like shape engageable with and disengageable from a first striker and a second striker in the front, wherein in installing the base member, a center of pivoting the base member is moved from a point of contact between the first striker and the U-like groove to a point of contact between the second striker and the C-like groove.

DETAILED DESCRIPTION OF THE PREFERRED EMBODIMENTS

Figure 1:
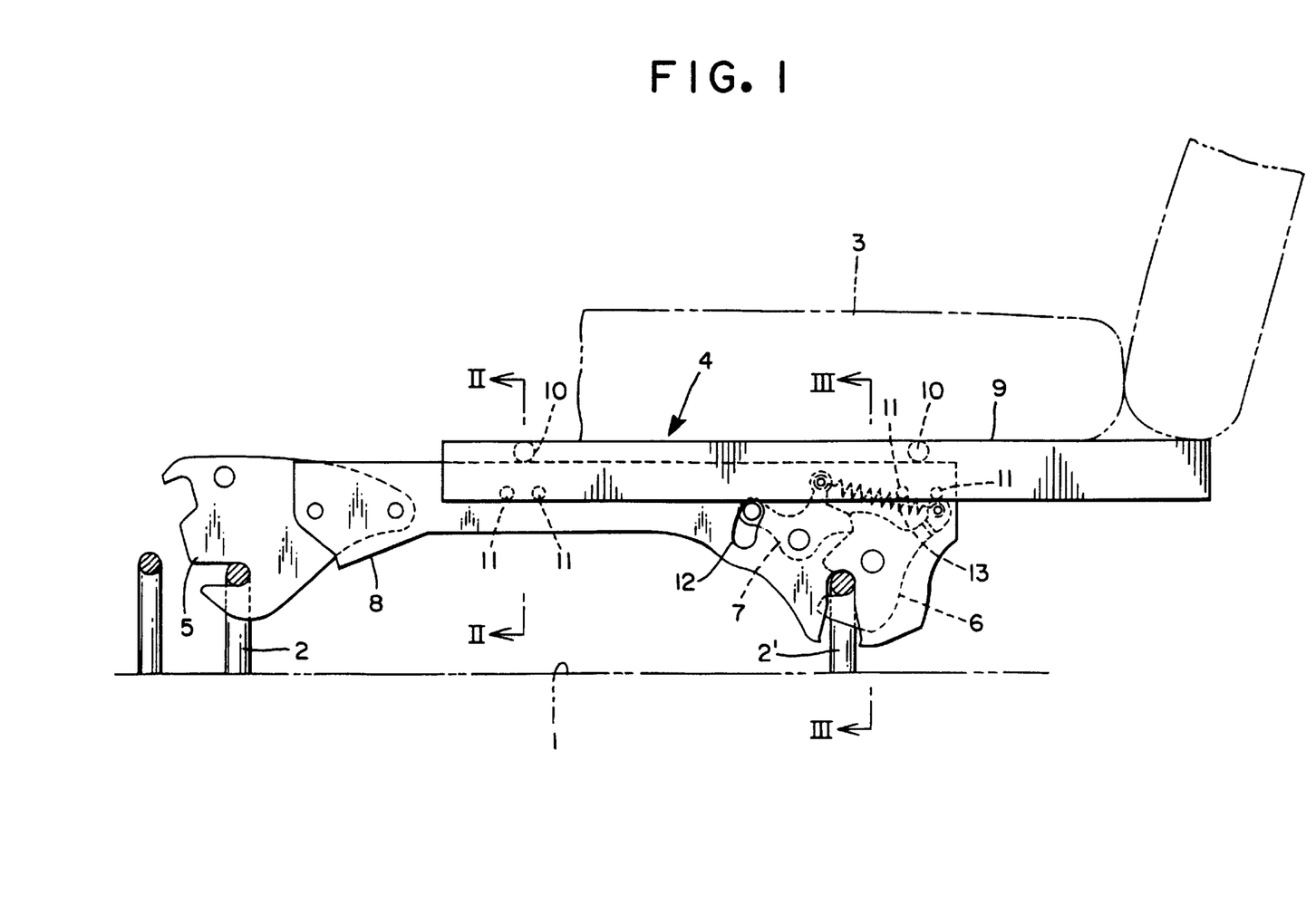
FIG. 1 is a side view of an embodiment of the invention.
Figure 2:
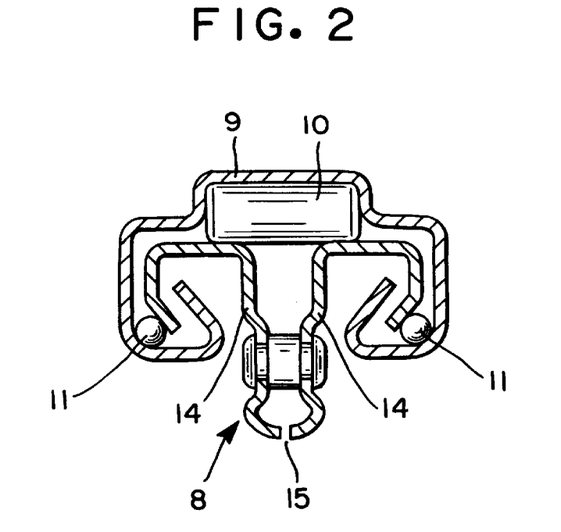
FIG. 2 is a sectional view taken along an arrow II—II in FIG. 1.

As shown by FIG. 1, in respect of a pair of strikers 2 and 2' separated from each other on a floor 1 of a vehicle, a hook portion 5 on the front side of a member 4 supporting a seat 3 is simply engaged with the striker 2, further, a ratchet 6 on the rear side is made attachable and detachable to and from the striker 2' and the ratchet 6 and a pawl 7 for operating the ratchet 6 are contained in the central space of the seat supporting member 4.

According to the illustrated embodiment, the seat supporting member 4 is constituted by a lower rail 8 and an upper rail 9 slidable relative to the lower rail 8. A publicly-known mechanism may be used for locking and unlocking the two rails 8 and 9 and a detailed illustration thereof will be omitted.

Figure 3:
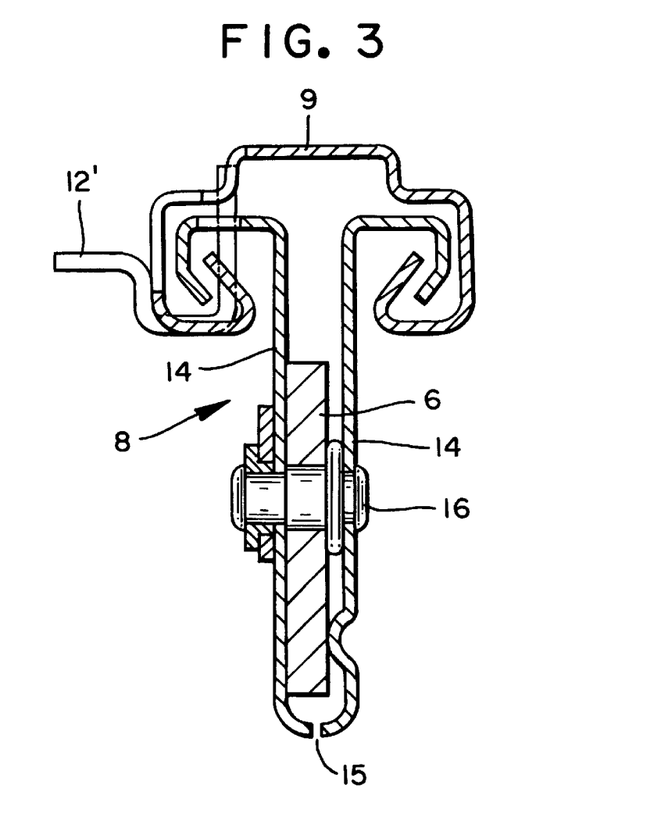
FIG. 3 is a sectional view taken along an arrow III—III in FIG. 1.

The upper rail 9 which is made of steel having section substantially in an inverted U-like shape, is slid relative to the lower rail 8 via rollers 10 and balls 11 and in order to lock the two rails 8 and 9, a lock lever 12' shown by FIG. 3 may be used.

In the latched state of FIG. 1, when the pawl 7 is pivoted in the counterclockwise direction against the tension of the spring 13 via a long hole 12 installed to the lower rail 8, an engaging portion of the pawl 7 is detached from the ratchet 6 and the ratchet 6 can be pivoted without being constrained by the pawl 7. Under this state, when the seat 3 is folded up around the front striker 2, the rear striker 2' causes the U-like groove of the ratchet 6 to rotate in the counterclockwise direction, and engagement between the striker 2' and the ratchet 6 is released and an unlatched state is established. Under the unlatched state, the U-like groove is maintained in a downward direction receiving tension of the spring 13. Therefore, in the latching process in which the ratchet 6 is engaged with the striker 2', the seat 3 is moved down as it is, the striker 2' is pressed to the U-like groove directed downwardly, the ratchet 6 is pivoted in the clockwise direction against the tension of the spring 13 and the engaging portion of the pawl 7 is locked to the ratchet 6 by the tension of the spring 13 to thereby provide the latched state.

The lower rail 8 has a structure in which portions each having a section substantially in an inverted L-like shape are separate from and facing outward from each other to thereby constitute a section substantially in a T-like shape. The lower rail 8 is provided with vertical wall portions 14 separate from and opposed to each other. The ratchet 6 and the pawl 7 are arranged in a space between the vertical wall portions 14.

Lower portions of the vertical wall portions 14 are curled to inner sides to thereby produce a circular arc portion 15.

Figure 4:
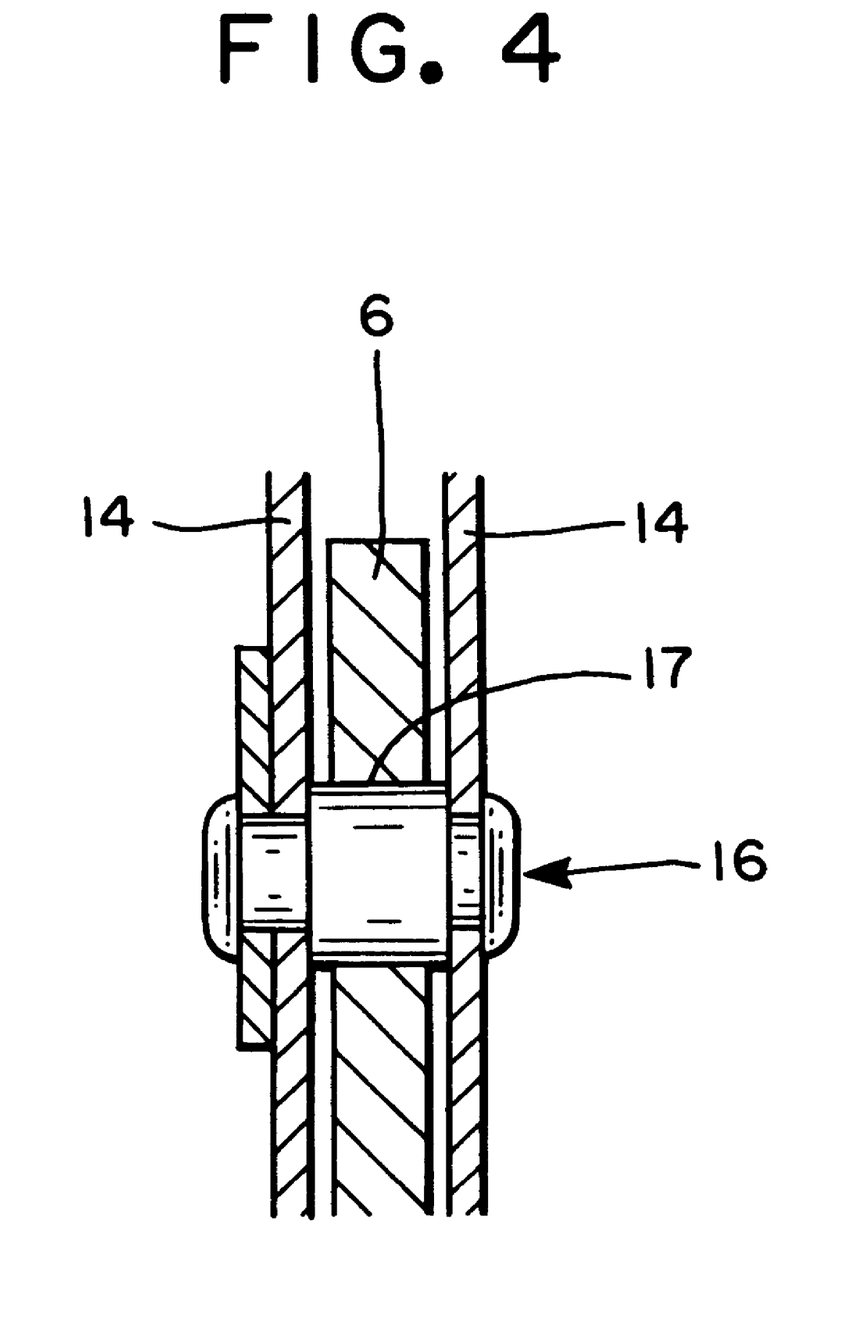
FIG. 4 is a sectional view showing an example of a pin for supporting parts.

As shown by FIG. 4, a pin 16 attached with the ratchet 6 and the pawl 7 disposed between the vertical wall portions 14 opposed to each other and other parts, is provided with a large diameter portion 17 between the vertical wall portions 14 and stepped difference portions between the large diameter portion 17 and small diameter portions are brought into contact with inner wall faces of the vertical wall portions 14 to thereby maintain the separation between the two vertical wall portions 14. Both ends of the pin 16 are calked.

An explanation will be given of a preferred example of the hook portion 5 constituting a principal portion of the invention referring to FIG. 5 through FIG. 8.

Figure 5:
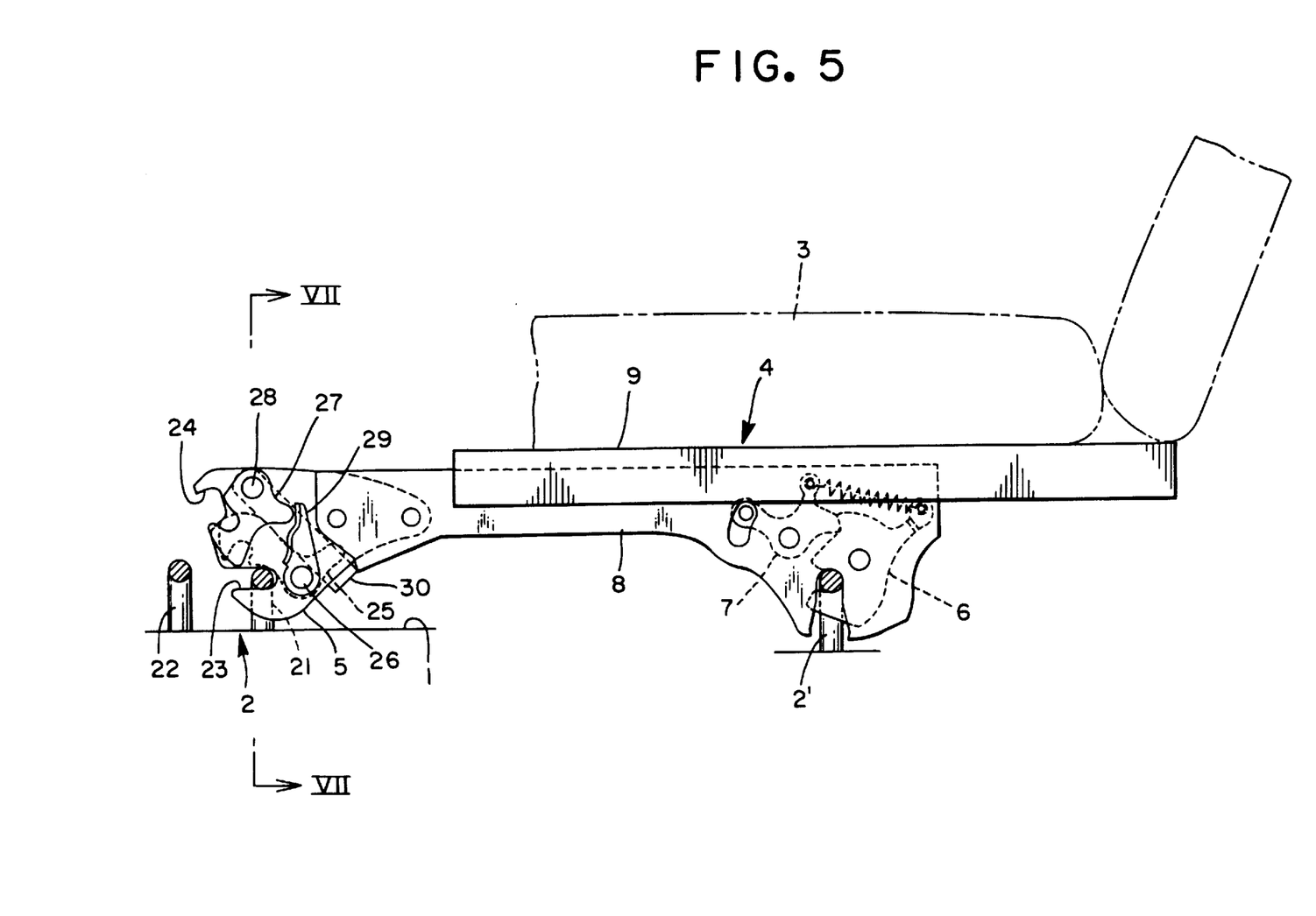
FIG. 5 is a side view showing engagement means between a hook portion and a front striker.
Figure 8:
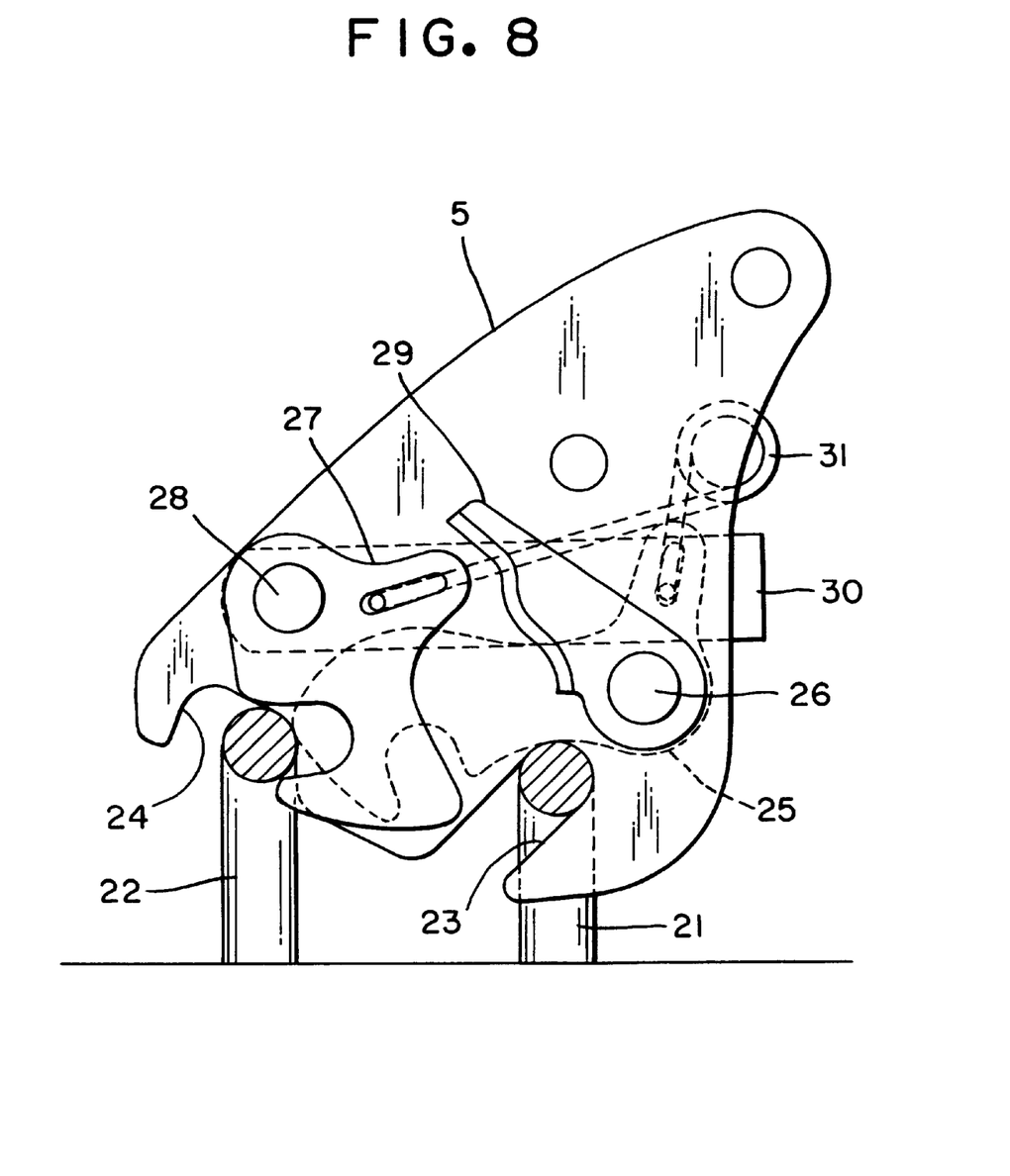
FIG. 8 is an enlarged detailed view of the hook portion.

The front striker 2 is provided with a first and a second striker 21 and 22, and the front edge of the hook portion 5, comprising a plate, is installed with a U-like groove 23 for receiving the first striker 21 and a C-like groove 24 for receiving the second striker 22.

On one side of the hook portion 5, a first hook 25, comprising a plate, is arranged to pivot along with a pin 26 and on the other side of the hook portion 5, a second hook 27 in a plate shape is arranged to pivot along with a pin 28. A connecting lever 29 is arranged on a side the same as the side of the second hook 27 and the lever 29 is fixed to the pin 26. A front end of the lever 29 can freely be brought into contact with the second hook 27 and movement of the second hook 27 is transmitted to the first hook 25. A latch releasing operational lever 30 is arranged on a side the same as the side of the first hook 25 and one end of the operational lever 30 is fixed to the pin 28. As a result, movement of the operational lever 30 in the counterclockwise direction pivots the second hook 27 in the counterclockwise direction along with the pin 28 and the movement pivots the first hook 25 and the pin 26 in the clockwise direction via the lever 29.

As shown by FIG. 8, the first and the second hooks 25 and 27 are respectively coupled to end portions of a spring 31. The central coiled portion of the retaining spring 31 is made to dispose at a constant position.

In a state of using the seat 3 shown by FIG. 5, the first striker 21 is fitted into the U-like groove 23, the rear striker 2' is engaged with the ratchet 6 and the seat 3 is fixed to the floor 1.

When the seat 3 is folded, that is, elevated, engagement between the ratchet 6 and the pawl 7 is released, the rear portion of the seat is lifted, the ratchet 6 is released from the rear striker 2' and the rear portion of the seat is further lifted.

In lifting the seat, the seat 3 is pivoted centering on the point of contact between the first striker 21 and the U-like groove 23, thereafter, the second striker 22 is brought into contact with the C-like groove 24, thereafter, while shifting the point of contact between the first striker 21 and the U-like groove 23, the center of pivot of the seat is moved to a point of contact between the second striker 22 and the C-like groove 24 and the seat 3 is pivoted centering on the point of contact. Such a movement of the pivoting center accompanied by slippage, engages the groove of the second hook 27 to the striker 22 and engages the groove of the first hook 25 with the first striker 21 and by pushing down the operational lever 30, there is produced the latched state shown by FIG. 6.

Figure 6:
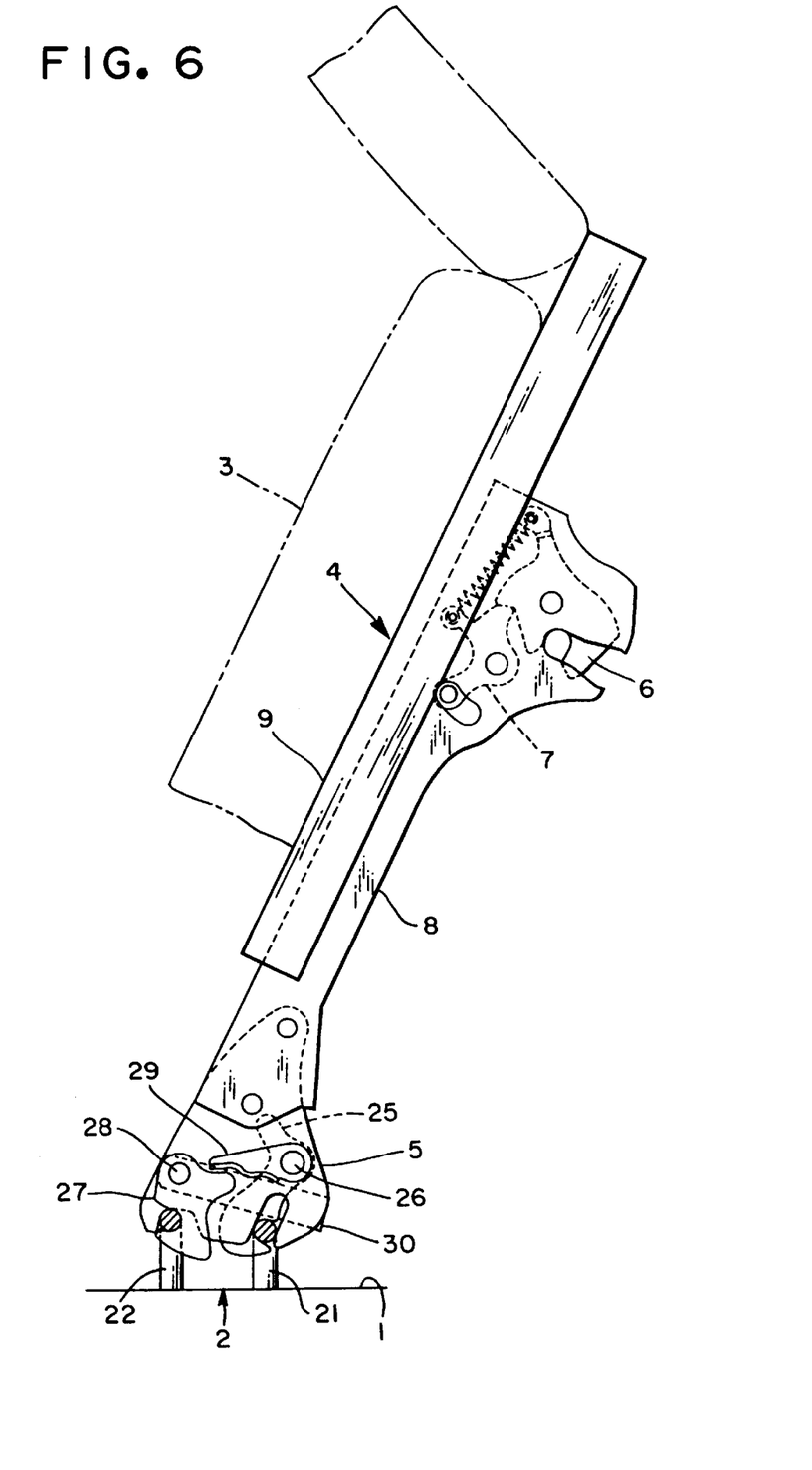
FIG. 6 is a side view showing the folded-up state of a seat.
Figure 7:
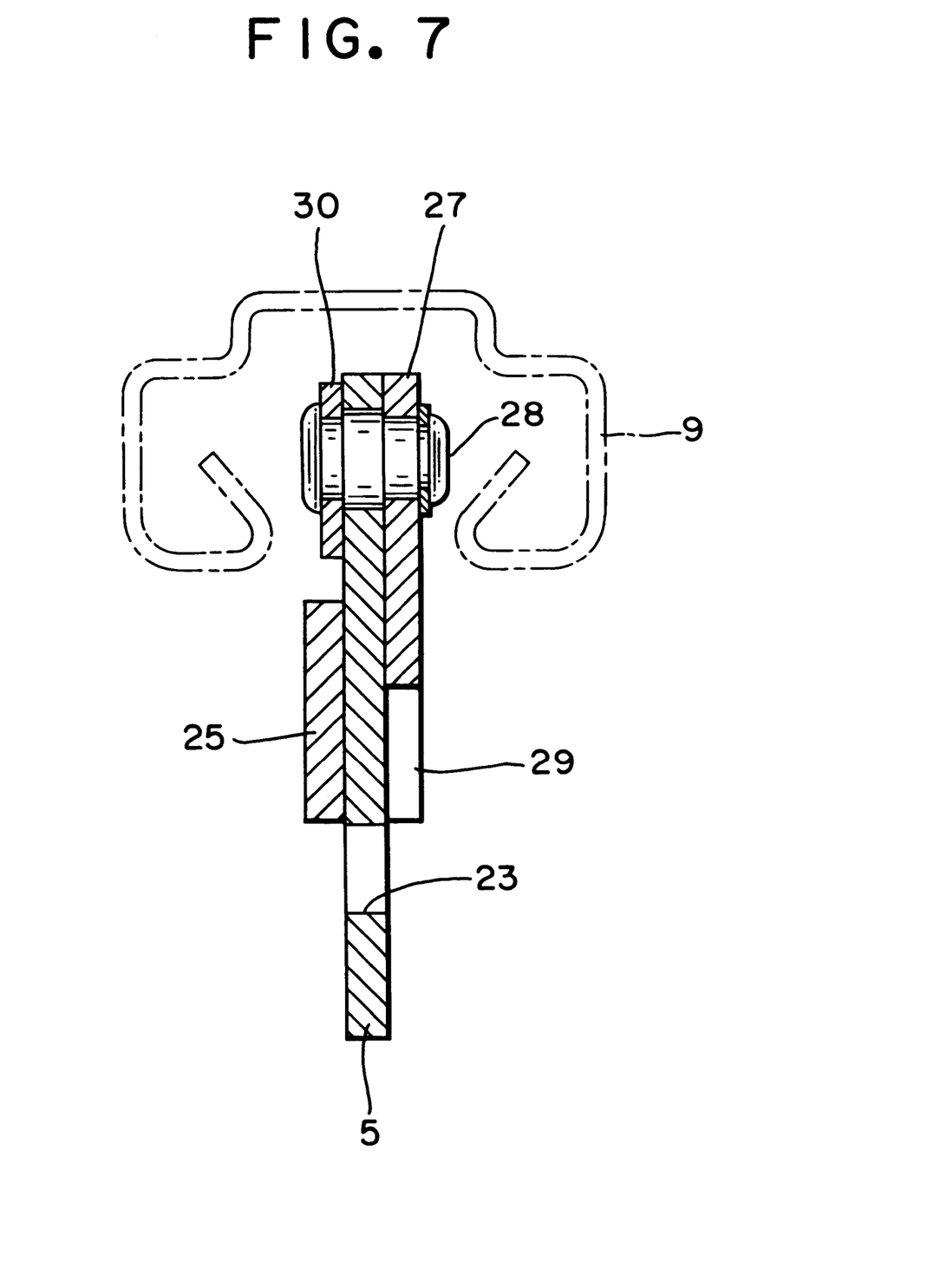
FIG. 7 is a sectional view taken along an arrow IV—IV in FIG. 5.

In order to release the latched state shown by FIG. 6, one end of the operational lever 30 is lifted, the pin 28 and the second hook 27 are pivoted in the counterclockwise direction and engagement between the C-like groove 24 and the second striker 22 is released. Movement of the second hook 27 is transmitted to the first hook 25 via the lever 29, engagement between the first striker 21 and the first hook 25 is released and the seat 3 can be moved to a horizontal position shown by FIG. 5. At this occasion, the center of pivoting the seat 3 is moved from the second striker 22 to the first striker 21 and slight slippage of the seat 3 is permitted.

As many apparently widely different embodiments of the present invention can be made without departing from the spirit and scope thereof, it is to be understood that the invention is not limited to the specific embodiments thereof except as defined in the appended claims.

What is claimed is:

1. A vehicle seat supporting apparatus comprising:
   a base member adapted to support a seat of a vehicle and movable by elevating at least a portion of the base member;
   a rear ratchet connected to the base member to move with the base member, the rear ratchet being attachable to and detachable from a rear striker fixed to a floor of the vehicle during elevating movement of the base member; and
   a front hook portion connected to a front portion of the base member, the front hook portion including a first groove engageable with and disengageable from a first front striker fixed to the floor of the vehicle and a second groove engageable with and disengageable from a second front striker fixed to the floor of the vehicle, a center of pivot of the base member during elevating movement moving from a point of contact between the first front striker and the first groove to a point of contact between the second front striker and the second groove.

2. The vehicle seat supporting apparatus according to claim 1, wherein the point of contact between the first striker and the first front groove moves along the first groove during elevating movement of the base member.

3. The vehicle seat supporting apparatus according to claim 2, including a first hook arranged on one side of the front hook portion and a second hook arranged on an opposite side of the front hook portion, and during elevating movement of the base member the first hook engages the first front striker in the first groove and the second hook engages the second front striker in the second groove to bring the base member into a latched state relative to the first and the second front strikers.

4. The vehicle seat supporting apparatus according to claim 3, wherein the first hook is secured to a first pin to pivot with the first pin and the second hook is secured to a second pin to pivot with the second pin, and including a connecting lever secured to said first pin to pivot with the first pin so that movement of one of the first and second hooks is transmitted to the other of the first and second hooks by way of the connecting lever.

5. The vehicle seat supporting apparatus according to claim 4, including a retaining spring having a central coiled portion disposed at a fixed position, one end of the retaining spring being locked by the first hook, the other end of the retaining spring being locked by the second hook, and including a pivotable operational lever fixed to the second pin.

6. The vehicle seat supporting apparatus according to claim 5, wherein pivoting of the operational lever in one direction moves the second hook into contact with the connecting lever, movement of the second hook is transmitted to the first hook via the connecting lever, engagement between the first hook and the first front striker and engagement between the second hook and the second front striker are released, overcoming a biasing force of the retaining spring, the first hook portion and the first front striker are brought into an unlatched state, and the second hook portion and the second front striker are brought into an unlatched state.

7. The vehicle seat supporting apparatus according to claim 6, wherein the base member comprises an upper rail adapted to support the seat and a lower rail having vertical wall portions separated from and opposed to each other.

8. The vehicle seat supporting apparatus according to claim 7, wherein a top portion of each of the vertical wall portions of the lower rail includes a leg extending outwardly away from the leg of the other vertical wall portion.

* * * * *